(12) United States Patent
Schrodi (10) Patent No.: US 7,466,690 B2
(45) Date of Patent: Dec. 16, 2008

(54) TRAFFIC RESTRICTION FOR A NETWORK WITH QOS TRANSMISSION

(75) Inventor: Karl Schrodi, Geretsried (DE)

(73) Assignee: Siemens Aktiengesellschaft, Munich (DE)

( * ) Notice: Subject to any disclaimer, the term of this patent is extended or adjusted under 35 U.S.C. 154(b) by 811 days.

(21) Appl. No.: 10/490,568

(22) PCT Filed: Sep. 20, 2002

(86) PCT No.: PCT/DE02/03538

§ 371 (c)(1),
(2), (4) Date: Mar. 19, 2004

(87) PCT Pub. No.: WO03/026229

PCT Pub. Date: Mar. 27, 2003

(65) Prior Publication Data

US 2004/0264376 A1 Dec. 30, 2004

(30) Foreign Application Priority Data

Sep. 20, 2001 (DE) ................. 101 46 349
Dec. 14, 2001 (DE) ................. 101 61 546

(51) Int. Cl.
*H04L 12/66* (2006.01)
(52) U.S. Cl. ............... 370/352; 370/360; 370/395.21; 370/395.3; 370/400; 709/225; 709/238
(58) Field of Classification Search ......... 370/235–237, 370/254–255, 351–360, 396, 398, 395.2, 370/395.21, 395.32, 395.42, 395.43, 395.5, 370/395.52, 400–401; 709/224–225, 238
See application file for complete search history.

(56) References Cited

U.S. PATENT DOCUMENTS

| 6,091,709 | A | 7/2000 | Harrison et al. | |
|---|---|---|---|---|
| 6,760,775 | B1 * | 7/2004 | Anerousis et al. | 709/238 |
| 2002/0097677 | A1 * | 7/2002 | Hoar et al. | 370/230 |
| 2002/0191539 | A1 * | 12/2002 | Rawlins et al. | 370/229 |
| 2002/0194362 | A1 * | 12/2002 | Rawlins et al. | 709/235 |

(Continued)

FOREIGN PATENT DOCUMENTS

DE     100 14 522 A1     10/2001

(Continued)

OTHER PUBLICATIONS

H. Hussmann et al: "An Edge Device for Supporting Internet Integrated Services Over Switched ATM Networks", Sep. 1998, Interworking Conference, Toronto, CANADA, pp. 6-7.

(Continued)

*Primary Examiner*—Binh K. Tieu
(74) *Attorney, Agent, or Firm*—Bell, Boyd & Lloyd (57) ABSTRACT

The invention relates to a method, a boundary node and a server for restricting the traffic in a packet-oriented, connectionless network for an efficient QoS transmission of prioritized data packets. According to the invention, reliability checks are carried out that include a reliability check with respect to the network input and the network output. The reliability checks allow to check whether resources meeting the requirements to transmission of a group of data packets of a priority class are available in the network. The invention allows to avoid resource shortages, especially at the network input and network output, thereby safeguarding QoS transmission.

12 Claims, 4 Drawing Sheets

U.S. PATENT DOCUMENTS

| | | | |
|---|---|---|---|
| 2002/0194369 A1* | 12/2002 | Rawlins et al. | 709/238 |
| 2003/0169751 A1* | 9/2003 | Pulkka et al. | 370/401 |
| 2004/0162901 A1* | 8/2004 | Mangipudi et al. | 709/225 |
| 2004/0210670 A1* | 10/2004 | Anerousis et al. | 709/238 |
| 2005/0007955 A1* | 1/2005 | Schrodi | 370/230 |
| 2005/0089327 A1* | 4/2005 | Ovadia et al. | 398/47 |
| 2005/0111459 A1* | 5/2005 | Stampfl et al. | 370/395.2 |
| 2006/0062216 A1* | 3/2006 | Li et al. | 370/389 |

FOREIGN PATENT DOCUMENTS

| | | |
|---|---|---|
| EP | 1 133 112 A | 9/2001 |
| WO | WO 93/11622 A | 6/1993 |
| WO | WO 99/66676 A1 | 12/1999 |
| WO | WO 01/54448 A | 7/2001 |

OTHER PUBLICATIONS

Blake, S. Black, D., Carlson, M. [u.a.]: "An Architecture for Differentiated Service", no date.

Nichols, K. Jocobson, V., Zhang, L.; A Two-Bit Differentiated Services Architecture for the Internet, no date.

* cited by examiner

TRAFFIC RESTRICTION FOR A NETWORK WITH QOS TRANSMISSION

CROSS REFERENCE OF RELATED APPLICATIONS

This application is the U.S. National Stage of International Application No. PCT/DE02/03538, filed Sep. 20, 2002 and claims the benefit thereof. The International Application claims the benefits of German application No. 10146349.9 DE filed Sep. 20, 2001, and German application No. 10161546.9 DE filed Dec. 14, 2001, both of the applications are incorporated by reference herein in their entirety.

FIELD OF INVENTION

The invention relates to a method, a network, a boundary node and a server for restricting the traffic in a packet-oriented, connectionless network for an efficient QoS transmission of prioritized data packets.

BACKGROUND OF INVENTION

The integration of telecommunications and data services leads to a series of requirements for the switching technology and networks. In order to be suitable for infotainment and commercial traffic at the same time, the networks used should have a high capacity, allow transmission in realtime, be reliable and guarantee a high degree of safety. In addition to this, a further condition is to keep costs as low as possible.

Previously, data services were to a large extent processed via IP networks (networks based on the Internet Protocol) that operate packet-oriented and connectionless at the IP level. Progress in router technology have led to the development of IP routers that, with a view to the capacity of the switched data traffic and delay times because of queues, basically allow telecommunications services and bandwidth-intensive services such as video-on-demand or video conferences in real time.

Difficulties are encountered in the case of a high rate of capacity utilization of the IP network for which the delay times increase exponentially or the excessive aggregation of data traffic on individual routes which then act as a bottleneck and limit the transmission rate.

Because of these difficulties exist, a high service quality generally referred to in the literature as quality-of-service (QoS) cannot be guaranteed to the desired extent for conventional IP networks.

Further developments aim at obtaining better information about the service quality without impinging on the lack of complexity and flexibility of the IP network.

The differentiated services (diff-derv) model is based on the observation that the best-effort handling of data packets in the IP network leads to the above-mentioned difficulties in guaranteeing service quality. Conventionally, data packets are transferred quickly and completely without guaranteeing the reliability and safety of the transmission. During high utilization or overloading of the network the service quality is impaired by delays or discarding of data packets.

The diff-serv concept aims at improving the service quality for services with high quality requirements by introducing service classes. In this context, the term CoS (class of service) model is often mentioned. The numbers 2474 and 2475 describe the diff-serv concept published by the IETF. The RFCs 2638 and 2998 deal with further aspects of the concept. Within the framework of the diff-serv concept, a DS (differentiated services) field in the IP header of the data packets prioritizes the packet traffic by setting the DSCP (DS code point) parameters. This prioritization takes place with a "per hop" resource allocation, i.e. the packets are treated differently for the nodes depending on the class of service specified by the DSCP parameters in the DS field. The expression per-hop behavior (PBH) is used in this context. For example, in the course of a PBH, priority is given to higher classes of service with regard to the arrangement and processing of queues in the case of nodes.

The central elements of a network based on the diff-serv concept are the DS subnetworks—in English often called the DS domain or single routing domain—and the DS boundary nodes. In many cases, a subnetwork conforms to the network of a service provider (service provider domain). For the DS boundary nodes a distinction is made between the DS ingress nodes and the DS egress nodes. Data packets reach a DS subnetwork via a DS ingress node and leave the subnetwork via a DS egress node. Therefore, a DS boundary node can then unite the functionality of a DS ingress node for incoming traffic and a DS egress node for outgoing traffic. The functionality of the DS boundary node includes selecting data packets according to the DSCP parameters and marking data packets by means of DSCP parameters. In addition, by means of devices for managing and conditioning the traffic, it is also possible to carry out control measures such as measuring data flows, distributing data packets to queues or rejecting data packets in the DS subnetwork. These control measures are often carried out in the DS ingress node or the DS egress node. Within the framework of traffic conditioning, data packets can be classified and compared to a traffic profile (e.g. bandwidth, resources) provided for the corresponding class of service. In the case of deviations from the traffic profile, measures such as arranging a queue or rejecting data packets can be carried out.

Typically, flows or connections are prioritized in a DS subnetwork. Prioritization takes place in a DS ingress node for the corresponding DS subnetwork, if required, by setting or changing the DSCP parameters. The core nodes of the DSCP parameters are read and assigned to the resources according to the prioritization. The DSCP parameters and resource assignment of the individual core nodes are interpreted separately from one another (per-hop behavior). For the egress nodes, changing the DSCP parameters is possibly canceled, i.e. the DSCP is reset to the original value. In this way, the DSCP can be adapted locally, i.e. depending on the subnetwork and its features.

The diff-serv concept avoids complex reservation procedures of routes or bandwidth and prioritizes the data traffic. When transmitting via several subnetworks, classes of service are specified by means of so-called service level agreements (SLA) for the entire transmission and converted by the individual subnetworks as described above within the framework of traffic conditioning. However, in practice temporary and/or local shortages, for example, by the aggregation of data traffic to individual routes also occurs. Usually, data packets with the same destination from the time they came together in a node, follow the same set route. For shortages the diff-serv concept sees to it that data packets with a low priority are first of all delayed or rejected. Therefore, the transmission quality for the high-priority data packets is improved, but quality standards e.g. for real-time transmission cannot be guaranteed. Within the framework of the diff-serv concept it would only be possible to guarantee transmission with QoS, i.e. a transmission for which specific quality statements are given and adhered to if the traffic profiles are adjusted with such a low utilization of the subnetwork that load peaks were catered for by reserve bandwidths. This is not usually undertaken for reasons of cost, i.e. because of the resulting low network utilization. For this reason, within the context of the diff-serv concept, reference is made to a CoS (class of service) approach rather than a QoS (quality of service) approach.

SUMMARY OF INVENTION

The object of the invention is to allow an efficient transmission of data packets with QoS for packet-switched, connectionless networks.

The invention aims at an efficient QoS-capable network with packet-switched and connection-oriented operation. The concept for the network includes the following three considerations:

A high efficiency requires flexibility in selecting the routes of data packets or their distribution. For example resource shortages can be avoided by dynamically changing or adapting routes.

A high complexity is avoided while local decisions are made (e.g. via routes, queues, rejecting data packets, etc.), e.g. in each case by the corresponding router. Non-local states or reservations of routes are avoided. Decisions about routes can be made depending on the data packet or depending on the connection or the flow. Thus, the distribution of individual data packets is the most flexible.

Guaranteeing QoS requires stringent boundaries and monitoring with a view to utilizing the network.

This patent application deals with the third aspect.

According to the invention, reliability checks allow checks to be made on whether or not the resources meeting the requirements for transmitting a group of data packets of a priority class are available in the corresponding network. According to the invention, reliability checks are carried out for at least one priority class for groups of data packets to be routed via the network. These reliability checks include a reliability check with respect to the network input and network output that can also be carried out at the network input and network output. Only in the case of data packet groups for which all the reliability checks are positive, transmission with the priority class of the data packets is allowed. On the other hand, for groups of data packets for which one of the reliability checks is negative, a different procedure is carried out (claim 1).

Therefore, one group of data packets can be specified by the data packets of a traffic stream or by the data packets aggregated at a physical port, e.g. at a network access (claim 2). A traffic stream, for example, corresponds to a flow, includes the data packets of a connection or includes data packets with identical address information such as all data packets with the same source or destination (claim 3).

In order to guarantee a QoS transmission, overloading the total capacity of the network and resource shortages must be avoided. In this sense, in the case of reliability checks, the group of data packets to be transmitted can be evaluated according to parameters such as average data and/or packet rate, peak rate, etc. and checks can be made on whether or not sufficient transmission capacity is available in order to transmit traffic streams with the required service quality. In addition, the reliability checks also ensure that sufficient resources (e.g. bandwidth, queue capacity, etc.) are available both at the input-side and output-side (claim 4). The check can depend on the priority class of the data packets or on the traffic with the same or higher priority (claim 5). For example, without a reliability check of the output-side, the resources of several inputs of the network could be transmitted to the same output and in this way result in a shortage at the output. Therefore, quality guarantees could then not be adhered to, but at best only a quality undertaking with respect to the prioritized handling of traffic streams in the same way as for the diff-serv concept.

For example, as a criterion for a positive result of the reliability checks, a threshold value can be used that is determined depending on the capacity of the network input and the network output used in each case, the total capacity of the network and the desired quality or priority class, etc. For example, traffic parameters such as the average data and/or the packet rate and the peak rate are reported for a group of data packets to be transmitted with a priority (claim 7). The desired priority class can also be reported. Alternatively, the priority class is determined on the basis of parameters or requirements such as the maximum loss rate and real-time transmission.

However, it is also conceivable that for each priority class there are several threshold values on the basis of different evaluation parameters that must all be kept separately or in the corresponding dependencies to one another. For a negative result of the reliability checks, the transmission of the group of data packets can be rejected (claim 6) or the transmission can be carried out with a low priority or not prioritized.

On the basis of the reliability checks, the resources (e.g. bandwidth, queues) can be reserved in accordance with the required quality features (claim 8). This reservation is usually the associated network access and output as well as the entire network load (e.g. capacity, handling in queues according to the prioritization).

Adhering to the central traffic parameters reported for the relevant traffic streams such as the transmission rate should possibly be monitored in order to guarantee adhering to the limit values or the threshold values for the utilization of the network (claim 9). The monitoring function—the terms traffic enforcement and policing are often used for this—will compare in a suitable way the traffic parameters specified when requesting the quality features with the actual traffic parameters of the corresponding traffic stream. Non-reported data packets can be blocked out (claim 10). Known traffic shaping mechanisms such as leaky bucket or token bucket can also be used at the network input. Possible overload prevention measures are as follows:

Rejecting data packets
Marking data packets
Buffering data packets
Switching over or blocking the traffic stream
Converting the data packets violating the agreement or the entire relevant data stream to a lower priority class or handling according to the best effort approach A QoS transmission of traffic streams with a corresponding priority class or traffic class requires a corresponding handling of the priority class. It is useful to only utilize a part of the entire capacity with prioritized traffic. The other part of the network capacity is then utilized with non-prioritized traffic. This non-prioritized traffic can then be treated according to the best-effort principle (claim 12). The reliability checks can then be restricted to the prioritized traffic (claim 11). This restriction of the prioritized traffic ensures that the capacity of the network can be fully utilized without the load peaks having a negative effect on the prioritized traffic. The quality level by means of which non-prioritized traffic is transmitted then virtually acts as a buffer for the prioritized traffic. A possible procedure of setting boundaries for the utilization with prioritized traffic is that a fixed maximum percentage utilization for traffic with the same or higher priority class must be given for each priority class. For example, it could be possible to set in a network with two priority classes for traffic with the higher traffic class the limit to a utilization with 30% and to specify the limit for traffic with the higher or lower priority class to 60%. For non-prioritized traffic, a minimum capacity of 40% would then remain.

When transmitting data packets, priority class-specific quality features could then be guaranteed in such a way that they allow a QoS transmission. Therefore, the concept according to the invention assumes that a suitable quality of service (QoS) is oriented at the specific service. For example, the human sense organs can to a certain extent process incomplete information without it resulting in any subjective quality losses. For the interactive control of machines (e.g. remote control of robots), the requirements are much clearer according to the circumstances. Criteria that are correspondingly more stringent should then be used. Therefore, depending on the service, criteria or limits can then be defined that guarantee a QoS transmission. For packet-oriented transmission these criteria are as follows:

Type and extent of possible information losses

Fixed and/or variable delays

The temporal consistence (sequence) of the information.

By adhering to utilization limits for the network, possibly within the framework of a service-specifically pre-defined statistical probability, and restricting the prioritized traffic as well as by good traffic distribution and limiting the traffic at the accesses and outputs of the network or the physical ports, statistical values for the quality loss factors can be specified. QoS services can be guaranteed with the aid of these statistical values and their variance.

BRIEF DESCRIPTION OF DRAWINGS

Two variants of the object according to the invention are shown below within the framework of the embodiment. They are as follows.

DETAILED DESCRIPTION OF DRAWING

For the sake of clarity it is assumed that the invention is used within the framework of a telephone call made via an IP network IPN, i.e. voice over IP (VoIP). This IP network IPN can for example be a single routing domain of the Internet. Telephone calls are subject to real-time requirements. Therefore, the relevant data traffic is prioritized. Accordingly, the object according to the invention can be used analogously for all the other services for which a prioritization of the data traffic is needed. Examples of such services are video-on-demand, Web conferences, multimedia applications, etc.

Figure 1:
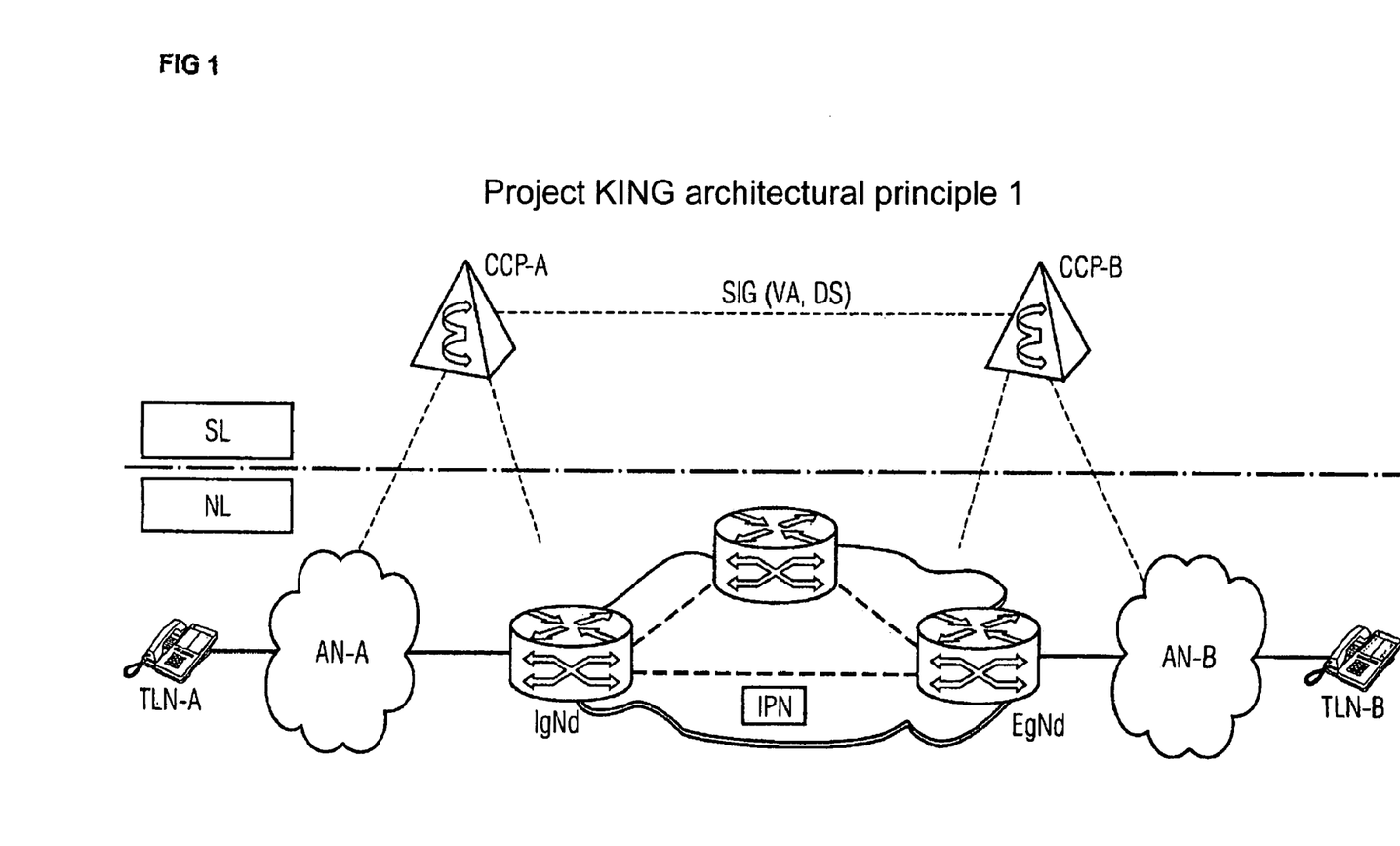
FIG. 1: System with data transmission via a network according to the invention

FIG. 1 shows a system with VoIP transmission. Via access networks AN-A and AN-B (AN: for access network), the telecommunications terminals TLN-A and TLN-B are connected to a public network that includes the IP network IPN. Within the framework of the two variants of the embodiment it is assumed that terminal TLN-A sets up a connection to terminal TLN-B by means of a telephone call. In this case a distinction is made between the service level SL (SL: for service level) and the network level (NL: for network level) that is shown in the figure by means of a dotted line. At the service level SL, signaling SIG(VA,DS) (SIG(VA,DS) for: signaling the connection setup and service control) of the connection setup and the service control takes place. For this purpose, control units CCP-A and CCP-B (CCP: for call control point) e.g. media gateway controller or switching devices are connected to the access networks AN-A and AN-B of terminals TLN-A and TLN-B. Useful data is transmitted to the network level NL and is at least sometimes routed to network IPN (IPN: for IP network) according to the invention. The network IPN operates packet-oriented and connectionless. Useful data packets that are transferred within the framework of the telephone call from terminal TNL-A to terminal TLN-B reach the network IPN via the boundary node IgNd (IgNd: for ingress node) and leave it again via the boundary node EgNd (EgNd: for egress node).

In the course of the connection setup at the service level SL, the call request is signaled from terminal TLN-A via the access network AN-A to the control unit CCP-A. Terminal TLN-A is authorized, for example, at the basis of name or address information. The called terminal TLN-B or the allocated control unit CCP-B is then identified and localized. Usually, a connection setup message is transmitted from the control unit CCP-A to the control unit CCP-B. Relevant information is extracted in the control unit CCP-B and at the access network AC-B the availability of terminal TLN-B is checked and relevant information is requested. The connection setup message is then acknowledged by the control unit CCP-B, sent to the control unit CCP-A and information such as address information of terminal TLN-B required for the connection is transmitted. The connection setup at the service level SL can then be concluded. In the case of a successful connection setup, useful data can then be exchanged at the network level NL.

In the case of the selected example, voice information in real-time, i.e. with QoS is exchanged as useful data. For QoS transmission, reliability checks are carried out according to the invention. Signaling takes place within the framework of these reliability checks, e.g. when transmitting the desired quality requirements, when transmitting the result of the reliability checks, etc. This signaling is designated as QoS signaling below. A distinction is made between two variants depending on whether or not QoS signaling is carried out at the service level SL or the network level NL within the framework of the reliability checks.

For QoS signaling at the service level SL the method according to the invention can be as follows: via the control units of the service level, CCP-Ig and CCP-Eg, the boundary nodes IgNd and EgNd are identified via which the useful data is transmitted as useful data packets. The control units CCP-Ig and CCP-Eg shown in FIG. 2 can be but do not have to be identical to the control units CCP-A and CC-P allocated to the access networks AN-A and AN-B.

Figure 2:
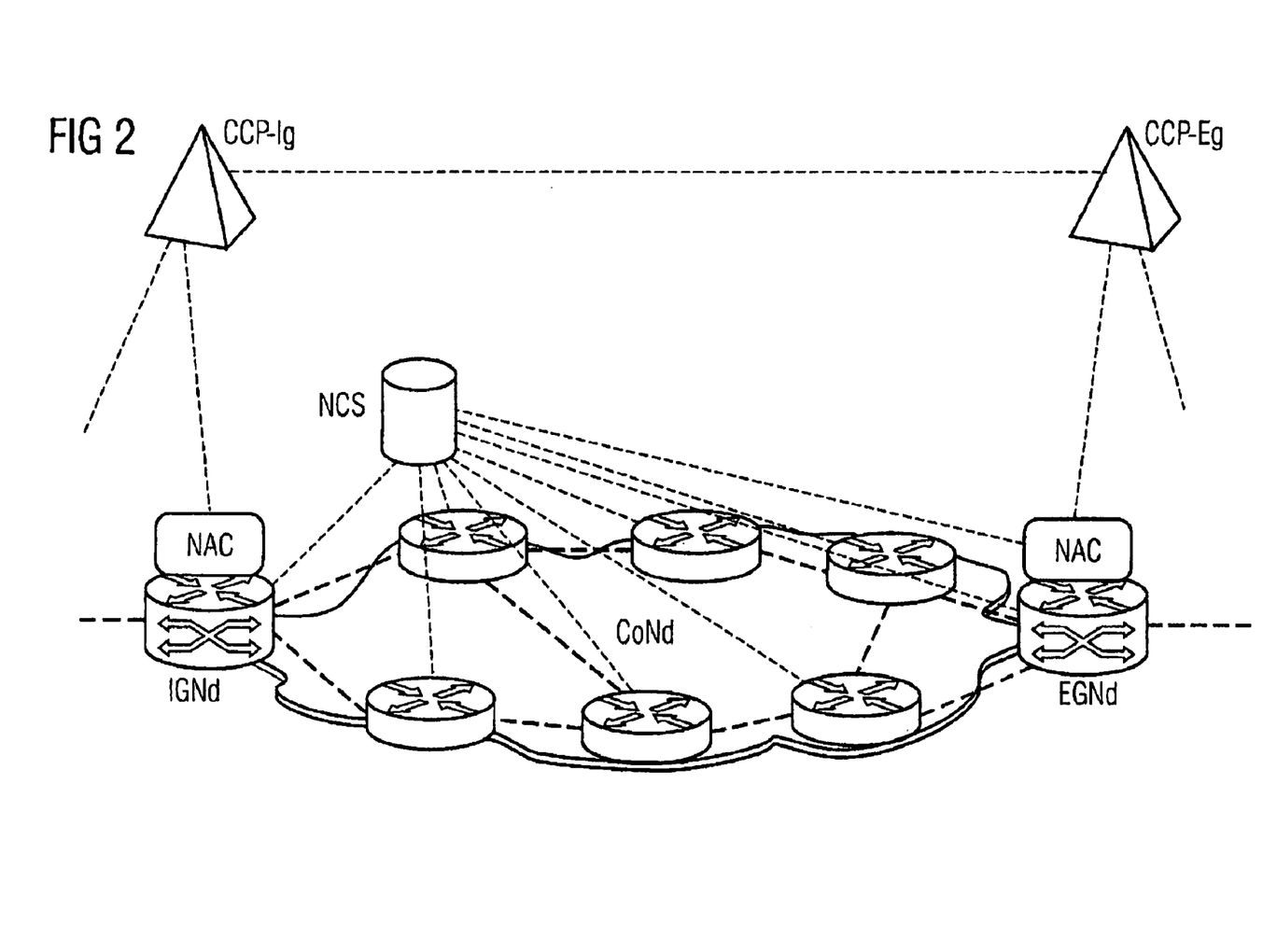
FIG. 2: A network according to the invention

Usually, many control units have to be involved in the signaling for long-distance calls at the service level SL. These control units then have direct access to only one section or a sub-section of the entire transmission route for the useful data. The control units CCP-Ig (CCP-Ig: for call control point at ingress node) and CCP-Eg (CCP-Eg: for call control point at egress node) are identified in such a way that they communicate with the boundary nodes IgNd and EgNd. Therefore, the two control units CCP-Ig and CCP-Eg can also coincide with each other.

FIG. 2 shows further boundary nodes. The core nodes CoNd (CoNd: for core node) are not shown individually. A control server NCS (NCS: for network control server) is also shown by means of which the network management tasks are observed.

According to the invention, the reliability checks NAC (NAC: for network admission control) regarding the network input and the network output are performed e.g. in the boundary nodes IgNd or EgNd. Via the control units CCP-Ig and CCP-Eg of service level SL, the requirements for the VoIP telephone call are transmitted to the boundary nodes IgNd and EgNd between terminals TLN-A and TLN-B. The requirements can include in addition to the relevant traffic parameters such as the bandwidth and the QoS requirements additional parameters regarding reliability, safety, etc. The result of the reliability checks at the network boundaries is signaled to the control units CCP-A and CCP-B. Depending on the results of the reliability checks, the transmission of useful data is either released or blocked on the A side and possibly an alternative route is searched for, for the purpose of useful data transmission (in English also known as bearer redirection). The reliability checks can also take place during the connection setup at the service level SL. For reliability checks during the connection setup, the connection setup can possibly be aborted for a negative result.

In the case of QoS signaling at the network level NL, the reliability checks are only initiated after the connection setup at the service level SL. After the successful connection setup at the service level SL, the QoS signaling is released at the network level NL and the relevant information such as the B-side address information is transmitted. This can take place by a corresponding message from the control unit CCP-A to a device positioned in the access network AC-A, e.g. media gateway. For QoS signaling it is also possible to make available from the service level SL, e.g. from the control unit CCP-A, a program structure, e.g. a Java Applet of the unit in the access network. By means of the address information requested within the framework of the service setup at the service level and, if required, by means of the downloaded program structure, a signaling message is sent at the network level to the B-side terminal TLN-B or the B-side access network AN-B. Via these and possibly other signaling messages, the boundary nodes IgNd and EgNd are localized and the reliability checks initiated in the boundary nodes. The results of the reliability checks are then signaled by messages at the network level NL to the A-side access network AN-A or the A-side subscriber TLN-A.

In addition to the reliability checks regarding the network input and output, a reliability check concerning the entire capacity of the network is carried out. This reliability check can e.g. also take place in one of the boundary nodes IgNd or EgNd, distributed to both boundary nodes IgNd and EgNd, or in a server provided for this in the network.

Figure 3:
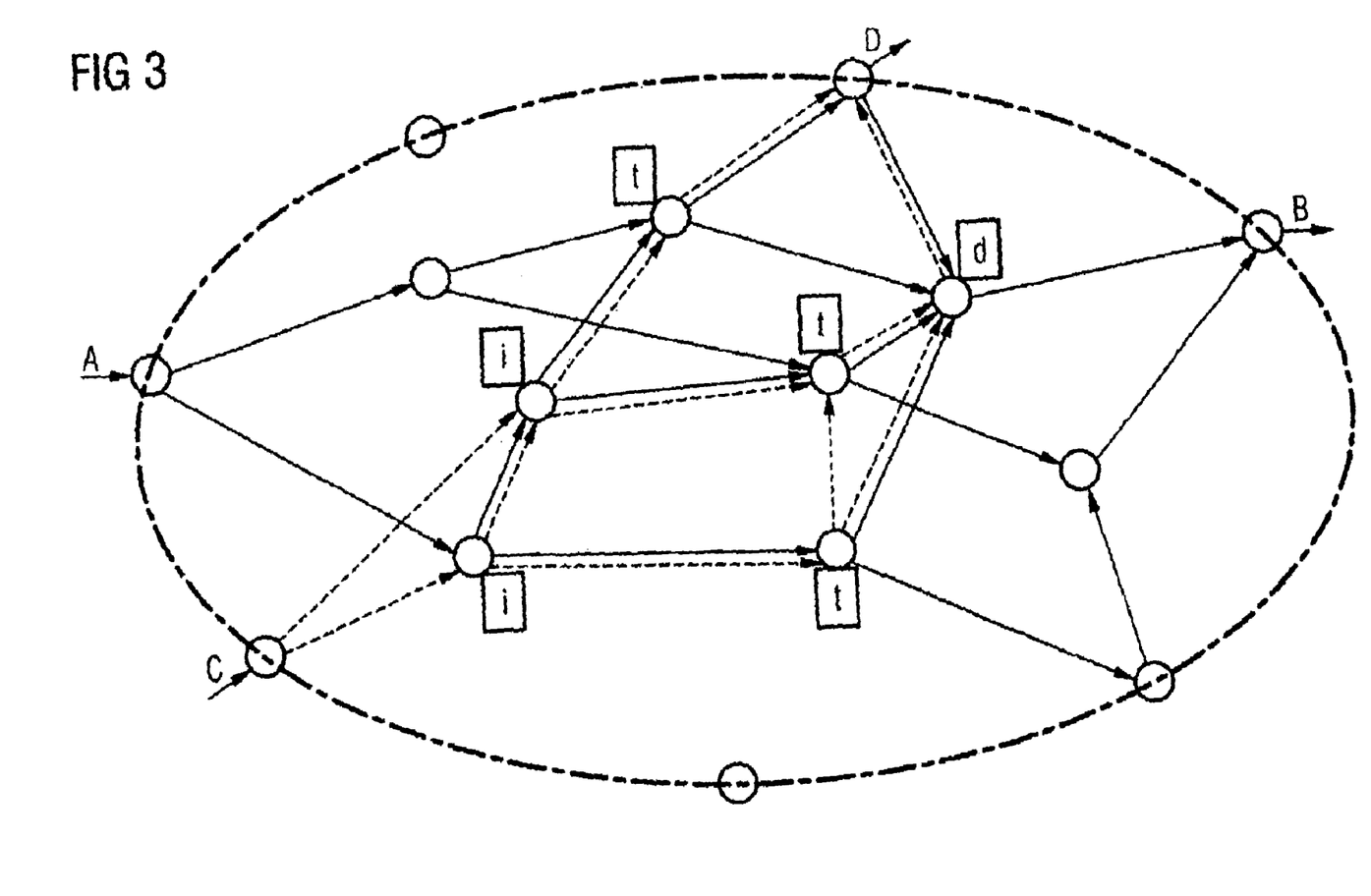
FIG. 3: Diagram of different routes for routing two flows in one network according to the invention

FIG. 3 is a diagram of different routes for routing two flows in one network according to the invention. The limit of the network is shown by means of a dotted line. Network nodes are shown by means of circles in which case the circles represent the rank nodes that intersect the dotted line. Arrows show possible routes for a flow. The dotted arrows are possible routes for a flow that reach the network for the rank node C and are transmitted to the rank node D where the data packets of the flow again leave the network. Drawn arrows show possible routes for a flow that are routes from the boundary node. A to the boundary node B. For most core nodes there is more than one alternative or branching for the route of the flow. In the case of a specific flow, the different alternatively possible route sections from a core node to the next node, i.e. for the "next hop" are designated below as branching compartments of the flow for the corresponding core node. For core nodes that lie on possible routes of both flows, it is indicated whether or not the branching compartments of the flow are identical i, sometimes disjunctive t or disjunctive d.

Possible routes are determined from the parameters of the network such as topology, capacity or the individual route sections, delay times, etc. Decisions about the route compartments via which a packet or a group of packets have to be transmitted, is made locally depending on the traffic parameters applicable at that moment. In this way, a relatively uniform utilization of the network is reached and load shortages are avoided.

Figure 4:
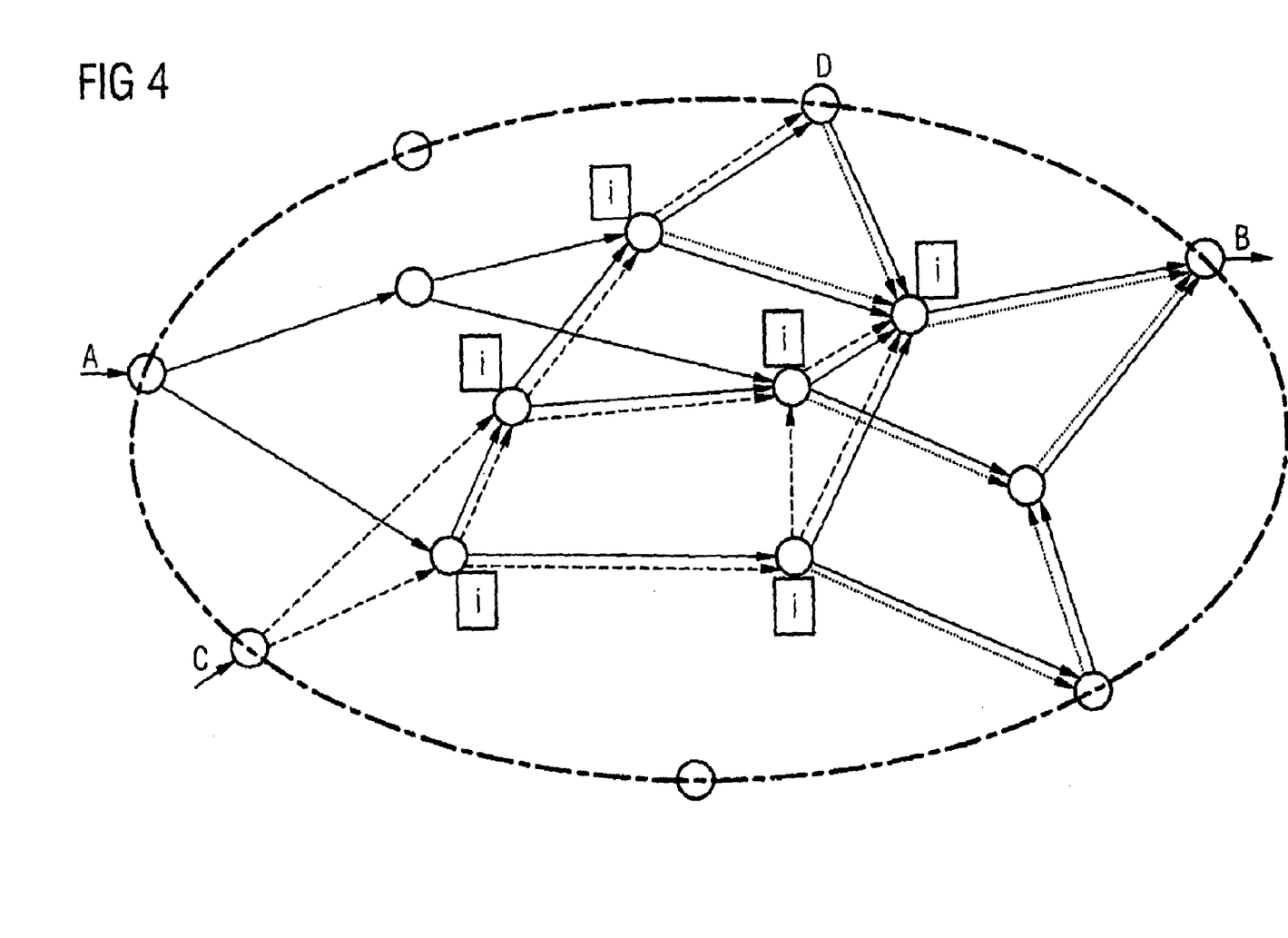
FIG. 4: Schematic diagram of different routes for routing two flows with the same destination in one network according to the invention.

FIG. 4 differs from FIG. 3 because of the fact that both flows leave the network in the case of boundary node B. The inner core that possibly lies on the routes of both flows, the distribution compartments of both flows are identical in which case the nodes are marked with an i. The distribution compartments could also deviate from one another within the framework of traffic control or traffic shaping. However, they will at least to a large extent be identical for flows with the same destination. The reliability checks according to the invention bring about that the boundary nodes B and the core nodes that are topologically adjacent to the boundary node are not overloaded by the arriving data packets of both flows. For example, if both flows cannot be transmitted with the reported parameters, one of them will not be permitted. When restricting the reliability checks to the network input, the configuration in FIG. 4 could lead to a shortage at boundary node B thereby endangering the guarantee undertaking of the QoS.

The invention claimed is:

1. A method for restricting the traffic in a packet-oriented connectionless network, comprising:
   receiving a voice over internet protocol (VoIP) call by a first access network from a first terminal, the access network communicatively coupled to an IP network having a plurality of nodes and to a first control unit;
   sending a connection setup from the first access network to the first control unit;
   transmitting a connection setup from the first control unit to a second control unit, the second control unit communicatively coupled a second access network that is communicatively coupled to the IP network and to a second terminal;
   identifying from the plurality of nodes an ingress node, the identification by the first control unit;
   transmitting requirements for the VoIP call from the first control unit to the ingress node;
   checking by the ingress mode that the respective node fulfills the requirements;
   identifying from the plurality of nodes an egress node, the identification by the second control unit;
   transmitting requirements for the VoIP call from the second control unit to the egress node;
   checking by the egress mode that the respective node fulfills the requirements; and
   establishing the bearer path from the first terminal to the second terminal over the IP network so that a group of data packets flow between the first terminal and the ingress node via the first access network and flow between the second terminal and the egress node via the second access network.

2. The method according to claim 1, wherein the group of data packets is specified by the data packets of a traffic stream or by the data packets of the priority class aggregated at a port.

3. The method according to claim 2, wherein the traffic stream is specified by a flow, the traffic stream allocated to a connection or including data packets with common address information.

4. The method according to claim 1, wherein a framework of the reliability checks of a rate of capacity utilization within an entire capacity of the network and an available bandwidth, the input-side and output-side network accesses are used when transmitting the group, of data packets.

5. The method according to claim 4, wherein the traffic of the priority class of the traffic stream and/or the traffic of a priority class transmitted is higher or the same as the priority class of the group of data packets.

6. The method according to claim 1, wherein the group of data packets is rejected if there is a negative result of the check by the egress node or by the ingress node.

7. The method according to claim 1, wherein traffic parameters for the group of data packets routed through the network are reported in the network including information concerning required transmission resources.

8. The method according to claim 7, wherein the transmission resources are reserved in accordance with the traffic parameters.

9. The method according to claim 7, wherein a check is performed during transmission of the traffic to determine whether or not reported traffic parameters are adhered to.

10. The method according to claim 7, wherein the non-reported data packets are blocked-out or discarded.

11. The method according to claim 7, wherein the reliability checks are only carried out for prioritized traffic.

12. The method according to claim 1, wherein the non-prioritized data packets are transmitted with an enhanced quality.

* * * * *